United States Patent Office 3,213,011
Patented Oct. 19, 1965

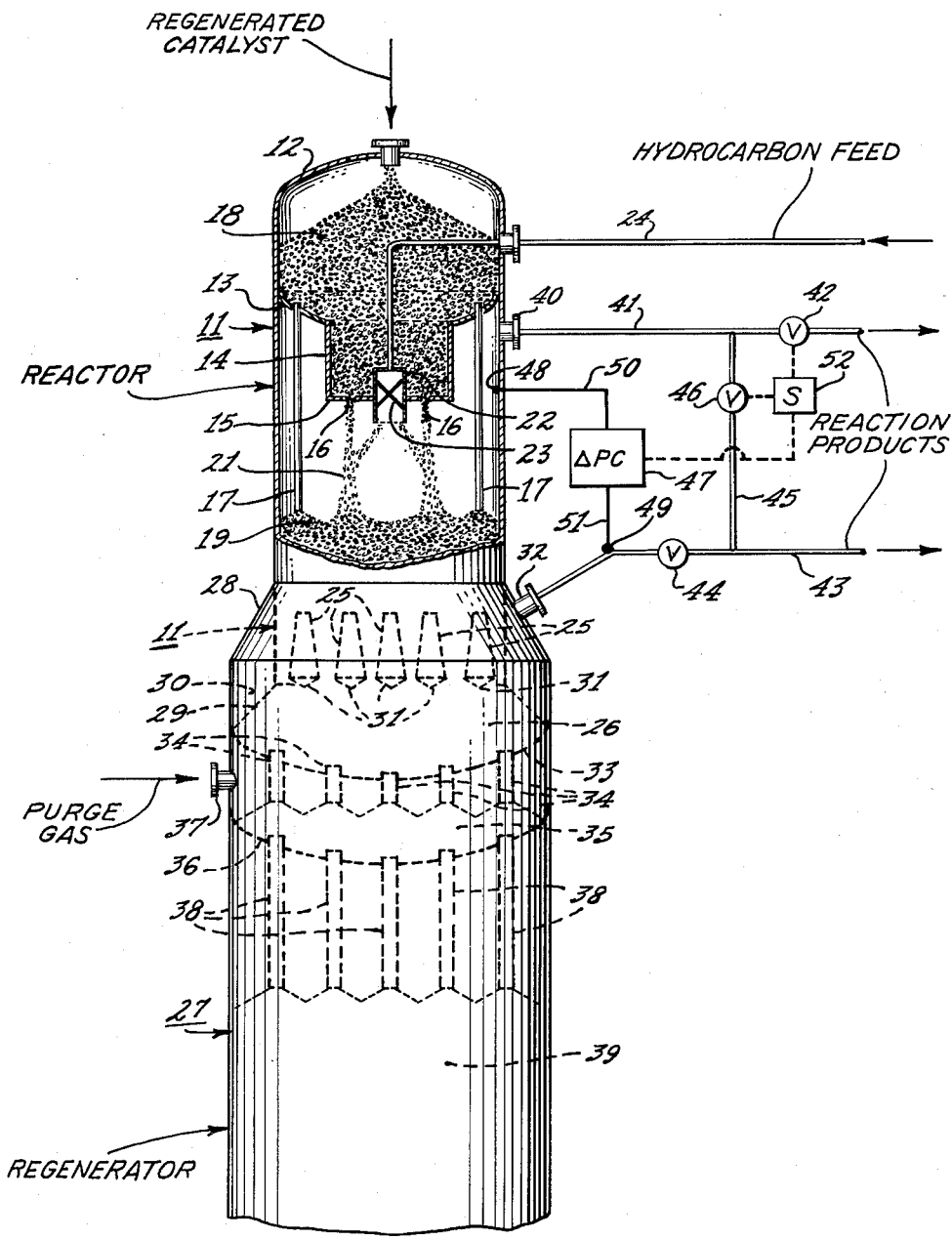

3,213,011
CONVERSION CONTROL IN CATALYTIC
CRACKING OF HYDROCARBONS
Willis J. Cross, Jr., Media, Pa., assignor to Air Products and Chemicals, Inc., Philadelphia, Pa., a corporation of Delaware
Filed Aug. 19, 1963, Ser. No. 302,782
10 Claims. (Cl. 208—74)

This invention relates to the catalytic cracking of hydrocarbons in the presence of particulate contact material, such as granular catalyst. The invention is particularly directed to moving-bed operations wherein the catalyst is maintained as a compact moving bed within the conversion or reaction zone, with fresh or regenerated catalyst particles being continuously supplied to the bed, at least in part by free fall, such as by an annular free-falling curtain of solids. In such operations, liquid, vaporous or mixed-phase hydrocarbons are generally supplied, at least in part, at a location well above the surface of the catalyst bed and are caused to pass through the curtain of solids, such as by a hollow-cone spray centrally within an annular curtain of solids. Substantially all the charge hydrocarbons contact the free-falling particles of catalyst before the latter are deposited upon the surface of the compact moving bed, so that the cracking reaction is initiated in the space above the compact moving bed. Completion of the desired cracking reaction is thereafter effected as the gaseous material passes through the compact moving bed.

Processes and systems of the above-mentioned type are well known in the petroleum refining art, as exemplified by U.S. Patents No. 2,734,805, issued February 14, 1956, to R. T. Savage et al.; and No. 2,906,705, issued September 29, 1959, to Willis J. Cross, Jr.

A particular problem constantly confronting the petroleum refining industry is that of adapting existing refining processes and systems to meet seasonal requirements for fuel oil, gasoline, or other refinery products. As applied to the catalytic cracking of hydrocarbon charge stocks, it is of considerable commercial advantage for a refiner to be able to change at will from an operation producing large amount of high octane gasoline and only moderate amounts of fuel oil to an operation producing substantially greater amounts of fuel oil and only moderate amounts of high octane gasoline. This is especially true when such flexibility in product distribution is effected without adversely affecting the system and without need for expensive modifications of the existing equipment.

It is known that the relative proportion of light gasoline product and heavier oil product produced by catalytic cracking is a function of contact time between the hydrocarbons and the catalyst within the conversion zone. Contact time, as applied to moving bed catalytic cracking processes means residence time of the hydrocarbons within the compact moving bed of granular catalyst maintained within the reactor or the reaction zone. Residence time, in turn, is a function of bed depth for any given reactor diameter. While it is known that some degree of flexibility in product distribution is attainable by varying the bed depth, such method of control has serious limitations in that there is a practical minimum bed depth below which there are encountered such problems of distribution, temperature variance, etc. as to render the process impracticable. Furthermore, changes in bed-depth normally require a plant shutdown.

In accordance with the invention a conversion control is provided for catalytic cracking systems by which seasonal demands for high octane gasoline and fuel oil may readily be met without substantial modification or redesign of equipment. Since the market demand for gasoline is high when the demand for fuel oil is low, such control effects a change or proportion in the product distribution for a given charge rate. The method of the invention provides an initial intimate contact for a period of less than five seconds between pre-heated hydrocarbon charge stock at a temperature of about 550 to 850° F., and granular catalyst substantially at regeneration temperture, such as about 1150° F., while the latter is gravitating as a free-falling mass of solids. A portion of the gaseous material resulting from such initial contact, such as about 20 to 40%, is immediately withdrawn as a first reaction product. This product is rich in fuel oil.

The free-falling catalyst, cooled to a temperature of about 830 to 980° F. by contact with the hydrocarbon charge, is collected as a compact moving bed of solids, and the remaining portion of gaseous material resulting from such initial contact is passed through the bed to complete the hydrocarbon cracking reaction. The volume is such as to provide a contact time of about 5 to 20 seconds, or possibly longer.

The gaseous material resulting from such secondary reaction is separated from the compactly flowing catalyst by standard disengaging and purging techniques and is withdrawn as a second reaction product. This product is relatively low in fuel oil constituents and rich in high octane gasoline.

In one preferred embodiment of the invention the free-falling mass of solids and the compact moving bed of solids are within a single confined zone or reactor, with the free-falling solids descending in the form of an annular curtain in the upper region of the confined zone and being deposited upon the surface of a bed of solids maintained in the bottom region of the confined zone, thus creating two reaction zones, namely, an initial reaction zone above the bed and a secondary reaction zone within the bed. Disengaging and purging of the secondary gaseous reaction products are effected in separate confined zones below the secondary reaction zone, within each of which zones the catalyst is reformed as a compact moving bed. The catalyst flows between the reaction, disengaging and purging zones in the form of multiple, compact moving columns. The withdrawal of gaseous products formed within the two reaction zones is effected through individual discharge conduits communicating with the space above the reactor bed and with the gas collecting space above the disengaged bed, each of which conduits is provided with its own control valve. Thus, the increased demand for fuel oil is readily met by controlled withdrawal of the products formed in the initial reaction zone, the amount so withdrawn determining how much of the total hydrocarbon charge will be subjected to more intensive cracking to produce the gasoline rich product.

A valve-controlled crossover conduit is provided between the gaseous product discharge conduits, communicating with points upstream of the valve in the first conduit and downstream of the valve in the second conduit. Thus, split streams of gaseous hydrocarbon products, one rich in fuel oil components and the other rich in high octane gasoline components, may be withdrawn from the catalytic cracking unit, or, if desired, the withdrawn streams may be combined into a single product stream. An external pressure controller, having associated pressure-sensitive devices located in the free space above the catalyst bed comprising the main reaction zone and also within the second discharge conduit at a point upstream of its control valve, enables the proportion of gaseous product discharging through the conduits to be controlled at will. Switching apparatus, actuated in response to the pressure controller, controls the flow of gaseous material through either the valve in the first discharge conduit or the valve in the cross-over conduit, thereby providing complete flexibility in controlling the proportional of fuel oil and high octane gasoline produced within the reactor of the catalytic cracking unit and in controlling the composition of the discharge product stream or streams.

For a fuller understanding of the invention, reference may be had to the following description and claims taken in connection with the accompanying drawing forming a part of this application, which drawing illustrates in fragmentary diagrammatic form a typical catalytic cracking unit to which the method of the invention may be applied, including external gaseous product withdrawal means and control devices associated therewith.

Referring to the drawing, which shows the upper or reactor portion of a catalytic cracking unit comprising superimposed hydrocarbon cracking and catalyst regeneration zones, the reactor comprises an upright cylindrical vessel 11, having a dished head 12 closing its upper end. Within the upper region of the vessel 11 there is provided an internal dished partition 13 having a central, depending cylindrical receptacle 14 at its lower end. Cylindrical receptacle 14 is provided with a horizontal bottom closure 15 provided with a narrow annular opening 16.

The upper region of the reactor, bounded by the dished head 12, a short portion of the cylindrical vessel 11, the cylindrical receptacle 14, and the bottom closure 15, forms a surge chamber for constantly maintaining a supply of catalyst in the form of a compact moving bed to be fed in controlled flow downwardly into the reaction zone which comprises the remaining lower portion of the vessel 11. Vertical downcomers 17, arranged in a circular row and distributed about the inner peripheral region of the vessel 11, have their upper ends set in openings provided in the curved outer portion of the partition 13 and have their lower ends terminating at a common level well below the bottom of the receptacle 14.

Catalyst is continuously passed from the surge bed 18 into the reaction zone. The catalyst particles are continuously discharged at a constant flow rate through the annular opening 16 and at a variable flow rate through the vertical downcomers 17. The catalyst supplied to the reaction zone through the opening 16 and the downcomers 17 forms a second compact moving bed of solids 19 comprising the principal reaction zone. The catalyst discharged through opening 16 descends by free fall in the form of an annular curtain of solids 21, which solids are deposited upon the surface of the bed 19. The catalyst discharged through downcomers 17 gravitates in the form of a plurality of compact moving streams of solids which discharge directly on to the surface of bed 19. In known manner the downcomers 17 serve to determine and maintain the upper level of the compact moving bed 19.

In the central region of horizontal closure 15 there is set a hydrocarbon charge or feed nozzle 22 in the form of a short vertical cylinder having internal angular vanes 23 located a predetermined short distance above its lower end. The hydrocarbon charge is introduced into the reaction zone through a conduit 24 which extends from an external source of supply, not shown, through the outside wall of the surge chamber and then downwardly through the bed 18 to the nozzle 22. The charge stream, such as a liquid-vapor hydrocarbon mixture, is rotated about its vertical axis in passing through the vaned portion of the nozzle. Centrifugal force causes the liquid components to move outwardly to the inner wall of the nozzle and thereafter to descend as a rotating hollow cylinder of liquid, while the vaporous components pass through the central region of the nozzle within the rotating cylinder of liquid. The charge stream leaves the nozzle as a hollow expanding cone of liquid and vapor, the liquid portion being broken up by centrifugal force into liquid droplets which intercept the free-falling particles of solid catalyst comprising the curtain 21.

The catalyst in the surge bed 18 is maintained at a temperature within the range suitable for effecting the desired conversion of the hydrocarbon charge, and the hydrocarbon charge stream supplied through conduit 24 has been preheated to an elevated temperature well below the temperature of the catalyst.

As the hydrocarbons discharging from the nozzle 22 come in contact with the hot catalyst in the free-falling curtain 21, the conversion reaction is immediately initiated and an appreciable portion of the desired conversion is effected while the catalyst particles are descending to the surface of the bed 19. Substantially all the vaporous portion of the original charge and the vapors formed by contact of the liquid with the catalyst pass through the curtain before reaching the surface of the bed. The volume of vapor passing through the bed 19 is controlled in amount or proportion dependent upon the amount of vapor immediately withdrawn from the region above the bed to satisfy the increased need for fuel oil.

At the bottom of the reactor vessel 11 the concurrently flowing catalyst and hydrocarbons pass through a horizontal grid formed by a row of parallel inverted, deep channel members 25, which form the disengaging section of the reactor. The compactly flowing catalyst of bed 19 is subdivided into narrow, horizontally-elongated, compact moving columns of catalyst in passing between the channel members 25. The columns are reformed into a third compact moving bed 26 within an enlarged cylindrical vessel 27 directly below the reactor vessel 11. Vessel 27 has its upper end in concentric, overlapping relation with the lower end portion of vessel 11. The upper end of the vessel 27 is joined to the outside wall of vessel 11 by means of a short frusto-conical section 28.

As the catalyst flowing from the bottom of vessel 11 into the vessel 27 spreads outwardly to form the expanded bed 26, an annular exposed surface of solids 29 is formed in the peripheral region of the lower vessel, from which surface a portion of the vaporous material is disengaged from the solids. The exposed surfaces of solids 31 formed beneath channel members 25 provide additional vapor-disengaging surfaces. The annular space 30 between the overlapping portions of vessels 11 and 27 forms a gas-collecting plenum 30. Thus, all the gaseous or vaporous reaction products disengaged from the bed 26 at the exposed surfaces 31, and collected in the spaces beneath the inverted channel members 25, are conveyed horizontally into the plenum 30. A discharge outlet 32 is provided in the frusto-conical section 28 for the withdrawal of the gaseous reaction products collected in the plenum 30.

Compact moving bed 26 is supported upon a dished partition 33 extending across the vessel 27. Partition 33 is provided with a plurality of short vertical nipples 34 through which catalysts is withdrawn from the bottom of bed 26 as a plurality of compact moving columns. The catalyst discharging from nipples 34 forms a fourth compact moving bed 35, which bed is supported upon a horizontal dished partition 36 located a relatively short distance below the partition 33. The region between the vertically-spaced partitions 33 and 36 constitutes a purging zone. Inert purge gas is introduced into the solids-free space above the surface of bed 35 and surrounding the short nipples 34 through an inlet 37 provided in the side wall of vessel 27. The purge gas enters the surface region of bed 35 in the areas surrounding the discharge ends of the nipples 34 and passes upwardly through the nipples and then through the bed 26 countercurrently to the blow of catalyst. The purge gas, together with any gaseous reaction products carried into or formed within the bed 26, is disengaged from the latter at the annular exposed surface of solids 29 and at the exposed surfaces of solids 31 formed beneath the inverted channel members 25. The admixture of disengaged purge gas and total gaseous reaction products is collected within the plenum 30 and subsequently discharged through outlet 32.

The purged catalyst is withdrawn from bed 35 through a plurality of elongated, vertical downcomers 38. The compact moving columns of catalyst discharging from downcomers 38 form a fifth compact moving bed 39 constituting the regeneration zone of the catalytic cracking unit.

The further progress of the catalyst through the catalytic cracking unit and the subsequent treatment thereof are not described or illustrated, since they form no part of the present invention and are well known in the art.

A portion of the gaseous reaction products which are formed in the upper region of the reaction zone, above the surface of the bed 19, upon initial contact of the introduced charge stock with the free-falling catalyst is withdrawn from the reactor vessel 11 through a side outlet 40. The gaseous material withdrawn through outlet 40 is conveyed through conduit 41 under the control of valve 42. This gaseous product, which is formed during the short period of contact between the charge stock and the free-falling catalyst, is rich in fuel oil. The gaseous reaction products withdrawn through outlet 32 and resulting from the prolonged period of contact between the compact moving catalyst and the charge stock within the bed 19, are conveyed through outlet conduit 43, under the control of valve 44. A crossover conduit 45, controlled by valve 46, connects the conduits 41 and 43 from a point upstream of valve 42 in the former to a point downstream of valve 44 in the latter. The valve arrangement is such as to permit controlled separate withdrawal of a stream of reaction products rich in fuel oil through conduit 41 and a stream of reaction products rich in high octane gasoline through outlet line 43. If it is desired to admix the two outlet streams in any desired proportion, valve 42 may be closed and valve 46 opened so that the total gaseous reaction product discharging through conduit 41 will pass through the crossover conduit 45 to be combined with the total product passing through the outlet line 43.

To obtain automatic control of the system a differential pressure controller 47 is connected between a pressure point 48 located in the upper region of the reactor vessel 11, above the surface of bed 19, and a pressure point 49 located in the outlet conduit 43, upstream of control valve 44, by means of conduits 50 and 51.

Differential controller 47 is set to maintain a predetermined pressure drop through the compact moving mass of catalyst comprising the bed 19 and the columns of catalyst passing between the channels 25, which pressure drop is a function of gaseous flow through the secondary reaction zone, that is, the bed 19. Controller 47 is connected to a switch 52 which may be selectively set to control the operation of either of valves 42 and 46 in the outlet and crossover conduits 41 and 45, respectively.

Thus, by closing valve 46 in the crossover conduit 45 and setting the switch 52 to connect valve 42 to the pressure controller 47 a fixed proportion of gaseous product flow will be maintained between conduit 41 and conduit 43 for any given charge rate through hydrocarbon feed conduit 24. To change the amount of fuel-oil rich product separately withdrawn through conduit 41, there are alternative procedures of either changing the hydrocarbon charge rate through conduit 24 or changing the space rate through bed 19 by lowering the pressure differential setting on the pressure controller 47.

Separate withdrawal of fuel-oil rich and high-octane-gasoline rich product streams by means of conduits 41 and 43, respectively, may be preferred where there are facilities for separately fractionating the product streams. Where such facilities are not available, or where there is a desire to combine the separate product streams, the total gaseous product may be combined in conduit 43 by closing valve 42 in conduit 41 and connecting valve 46 of crossover conduit 45 to the pressure controller 47 by means of selector switch 52. The total product stream may then be passed by conduit 43 to a single fractionator, not shown.

In a typical operation, in accordance with the invention, a gas oil charge stock having an initial boiling point in the range of about 500 to 600° F., and an end boiling point in the range of about 1000 to 1250° F., is introduced into the reactor vessel 11 through the feed nozzle 22. As stated, the charge stock may be either all liquid or all vapor, but preferably the charge stock will comprise a mixed-phase stream in order to utilize to best advantage the free-falling curtain of catalyst. The charge stock supplied through conduit 24 is preheated in known manner to about 575 to 800° F. The amount of catalyst fed into the reactor through the free-falling curtain 21 and through the downcomers 17, is such as to maintain a catalyst-oil ratio in the order of about 5/1 to 10/1. The pressure within the reactor is maintained at a level in the order of about 7 to 13 p.s.i.g. and the pressure in the outlet line 43 upstream of the control valve 44 is maintained in the order of about 4 to 6 p.s.i.g. Of the total gaseous reaction product, about 20 to 40% is withdrawn through the outlet line 41, while the remaining 80 to 60% is withdrawn through the outlet line 43.

By the method of the invention it is possible for a refiner having moving-bed catalytic cracking facilities designed primarily for production of considerable quantities of high octane gasoline to cut back on such production and to increase the production of fuel oil in response to seasonal demands. Modification of present systems to incorporate the additional apparatus required to carry out the method may be made at relatively low cost and without serious disruption of current operation. Within practical limits, the increased demand for fuel oil may be met by merely changing the proportion between product withdrawn from the initial reaction zone and product withdrawn from the secondary reaction zone. Additional fuel oil production may be obtained without unduly increasing such proportion by increasing the charge rate. It is a particular advantageous feature of the invention that the ratio of gasoline to fuel oils may readily be varied without penalty to the total gasoline octane.

Obviously many modifications and variations of the invention as hereinbefore set forth may be made without departing from the spirit and scope thereof, and therefore only such limitations should be imposed as are indicated in the appended claims.

What is claimed is:

1. In a catalytic hydrocarbon cracking process in which a compact mass of hot granular catalyst gravitates sequentially through (1) a reaction zone wherein the catalyst is maintained as a compact moving bed, fresh regenerated catalyst is continuously introduced as a free-falling curtain of solids descending onto the surface of said bed, hydrocarbon feed, at least partly in liquid phase, is introduced into the region of the reaction zone above the surface of the bed in such manner that substantially all the liquid hydrocarbons are intercepted by the free-falling catalyst, low-boiling components of the liquid feed are vaporized and initially cracked by contact with the falling catalyst, higher-boiling components of the liquid feed are deposited on the catalyst and carried thereby into the bed where they undergo prolonged and more intensive cracking treatment and the gaseous reaction products derived from the gaseous phase portion of the hydrocarbon feed and from said vaporization and cracking of both low-boiling and higher-boiling components of the liquid feed flow downwardly through said bed; (2) a disengaging zone wherein catalyst discharged from the reaction zone is reconstituted as a second compact moving bed having an exposed surface at which gaseous material withdrawn from the reaction zone with the catalyst is disengaged from the latter; and (3) a purging zone comprising said second bed wherein a gaseous purging medium is caused to flow countercurrently through the bed to strip the latter of additional gaseous reaction products carried by the catalyst past the disengaging zone as well as gaseous material formed within the second bed, the total effluent from said disengagement zone normally comprising a high proportion of high octane gasoline to fuel oil; the method for selectively controlling said process to vary said proportion of high octane gasoline to fuel oil which comprises the steps of
  (a) withdrawing from said region of the reaction zone above the catalyst bed a portion of said gaseous reaction products which are rich in fuel oil and which otherwise would flow downwardly through said bed;
  (b) withdrawing from said disengaging zone the remaining portion of gaseous reaction products, which having passed through the reactor bed are rich in high octane gasoline, together with the gaseous product of purging; and
  (c) controlling the amount of gaseous product withdrawal in step (a) to obtain the desired proportion of fuel oil to high octane gasoline in the total gaseous product.

2. The method as in claim 1 in which both liquid and vaporous hydrocarbons are introduced into said region of the reaction zone above the catalyst bed.

3. The method as in claim 2 in which said liquid and vaporous hydrocarbons comprise a single mixed-phase charge stream.

4. The method as in claim 1 in which said free-falling curtain of solids is annular, and said liquid hydrocarbon components are introduced at the axis of said annular curtain and as a downwardly-directed, expanding cone of liquid droplets which intersects said curtain a substantial distance above the surface of said bed.

5. The method as in claim 4 in which said liquid hydrocarbon components introduced axially downward with said annular curtain of solids are accompanied by vaporous hydrocarbons.

6. The method as in claim 1 in which the amount of gaseous reaction products withdrawn, as in step (a), in controlled amount, as in step (c), is determined in accordance with the pressure differential existing between said region of the reaction zone above the catalyst bed and the outlet from said disengaging zone.

7. The method as in claim 6 in which the gaseous reaction products withdrawn as in step (a) are combined in controlled amount with the gaseous reaction products withdrawn as in (b).

8. The method as in claim 7 in which the amount of gaseous reaction product from step (a) which is combined with the gaseous reaction product from step (b) is determined in accordance with the pressure differential existing between said region of the reaction zone above the catalyst bed and the outlet from said disengaging zone.

9. The method as in claim 6 in which 20–40% of the total gaseous reaction product is withdrawn as in step (a) and the remaining 80–60% is withdrawn as in step (b).

10. The method as in claim 9 in which at least a portion of the gaseous reaction product withdrawn as in step (a) is combined with the gaseous product withdrawn as in step (b) to produce a final product stream having a predetermined ratio of fuel oil to high octane gasoline components.

References Cited by the Examiner
UNITED STATES PATENTS

| | | | |
|---|---|---|---|
| 2,528,586 | 11/50 | Ford | 208—166 |
| 2,571,342 | 10/51 | Crowley | 208—166 |
| 2,935,461 | 5/60 | Bland | 208—74 |

DELBERT E. GANTZ, *Primary Examiner.*

ALPHONSO D. SULLIVAN, *Examiner.*